UNITED STATES PATENT OFFICE.

ALBERT T. FLETCHER, OF BOSTON, MASSACHUSETTS.

SILVER-POLISH.

1,113,322. Specification of Letters Patent. Patented Oct. 13, 1914.

No Drawing. Application filed January 5, 1914. Serial No. 810,349.

*To all whom it may concern:*

Be it known that I, ALBERT T. FLETCHER, a citizen of the United States, and a resident of Boston, in the county of Suffolk and State of Massachusetts, have invented certain new and useful Improvements in Silver-Polish, of which the following is a specification.

This invention has for its object to produce a substance or compound which may be used for cleansing and polishing glassware and silverware, and the like, on which it is desirable to secure a fine luster or polish.

I employ, as the base of my compound, a cereal soap powder formed by subjecting finely comminuted vegetable material such as corn meal, starch or other protein-containing substance to the action of a highly concentrated solution of caustic soda or caustic potash, and removing the free alkali by exposing the dry material to the atmosphere until the free alkali forms a carbonate. Such soap powder is known upon the market by the trade name of "Zap".

It is unnecessary to herein describe in detail the process of producing the soap powder as the same is fully described in Letters Patent of the United States, No. 1,027,744, to Robert Macpherson and William E. Heys, dated May 28, 1912. I have found that, where a cereal soap powder of this general nature is emulsified, I am able, by mixing a suitable abrasive material therewith, to secure a homogeneous jelly-like solid in which the particles of abrasive material are uniformly suspended and out of which they will not separate, notwithstanding that an excess of water may be employed in forming the emulsion.

As an example of a method of producing the material, I proceed as follows: To approximately 1 pound of the dry soap-powder, known as "Zap", I add 4 quarts of boiling water, and heat the mixture for approximately 3 minutes to a temperature slightly below 212° F., the mass being continuously agitated. During the heating and mixing, the mass emulsifies, and, on being permitted to cool, gelatinizes or forms a jelly-like solid. During the boiling, I add and thoroughly mix in approximately 4 pounds of a suitable abrasive material, such, for instance, as oxid of silica in the form known as infusorial earth, this being added after the soap powder has been dissolved and before the gelatinization takes place. The mixture is then permitted to cool and set, and the abrasive material is completely held in suspension uniformly throughout the entire jelly-like mass without any tendency to separate. The solidity of the mass of course will vary in the proportion in which the soap-powder is added.

In its dry form, the soap powder contains fine granules of the vegetable matter such as meal or flour, but during the soaking and boiling process the particles are so thoroughly softened that there is no danger of their scratching or injuring the surface to which the substance is applied.

It is evident that, instead of boiling the solution in the emulsifying process, the water may be added to the powder at atmospheric temperature. In such case, however, the proportion of the soap powder is increased and the time required for the emulsifying effect is likewise increased. Where cold water is used, the mixture should be stirred from time to time, and when it shows a tendency to set, the abrasive material should be added and thoroughly stirred in.

If desired, substances may be added to the mixture to give it a pleasant odor or to color it. For instance, I may add to the mixture above stated about ¼ ounce, by weight, of oil of wintergreen, and sufficient analine coloring matter to impart the desired color to the mixture. I may also add a small proportion of sodium thiosulfate for dissolving the discolorations on metal produced by certain oxids and chlorids.

Silver polish, produced as herein described, may be used without injury to the skin, since the soap powder which is initially used has no free alkali and consequently there is none in the mixture which might prove injurious to a user. On the other hand, should ordinary soap powders be utilized for this purpose, the free alkali therein contained roughens and injures the skin of the user. Another advantage which is secured by the use of a soap-powder containing finely comminuted vegetable matter such as meal treated with concentrated lye and carbonated as described in the Letters Patent herein previously referred to, is that the vegetable matter or soda compound is glutinous, and, as a result, a jelly-like substance is produced upon emulsification by using a relatively small quantity of the soap powder. The substance herein described produces a brilliant polish upon glass and metals and leaves the surface thereof free from the trace of oil or dirt.

I claim:—

1. The herein described polishing material which consists of a homogeneous gelatinized alkali-free cereal soap containing an abrasive in suspension.

2. The herein described polishing material consisting of a gelatinous homogeneous mass, formed by emulsifying the soap powder (produced by subjecting a comminuted protein-containing substance to the action of a highly concentrated alkali and carbonating the free alkali) with water, and containing a finely divided abrasive held in suspension uniformly throughout the mass.

3. The herein described polishing compound consisting of emulsified and gelatinized cereal soap powder and an abrasive material in a homogeneous mixture.

4. The herein described process of making a polishing compound, which consists in emulsifying with water a cereal soap powder produced by subjecting a comminuted protein-containing substance to the action of a highly concentrated alkali, mixing a comminuted abrasive material with the emulsion, and causing the mixture to gelatinize with the particles of abrasive material held in suspension.

5. The herein described process of making a polishing compound, which consists in emulsifying a cereal soap with water, mixing a comminuted abrasive material with the emulsion, and gelatinizing the mixture with the abrasive material in suspension.

In testimony whereof I have affixed my signature, in presence of two witnesses.

ALBERT T. FLETCHER.

Witnesses:
 MARCUS B. MAY,
 J. M. MURPHY.